(12) United States Patent
Manome (10) Patent No.: US 11,759,946 B2
(45) Date of Patent: Sep. 19, 2023

(54) VERTICAL ARTICULATED ROBOT AND TWO-AXIS ROBOT

(71) Applicant: YAMAHA HATSUDOKI KABUSHIKI KAISHA, Iwata (JP)

(72) Inventor: Toshifumi Manome, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 17/761,916

(22) PCT Filed: Sep. 25, 2019

(86) PCT No.: PCT/JP2019/037654
§ 371 (c)(1),
(2) Date: Mar. 18, 2022

(87) PCT Pub. No.: WO2021/059404
PCT Pub. Date: Apr. 1, 2021

(65) Prior Publication Data
US 2022/0347840 A1    Nov. 3, 2022

(51) Int. Cl.
*B25J 17/00* (2006.01)
*B25J 9/12* (2006.01)
*B25J 17/02* (2006.01)

(52) U.S. Cl.
CPC .............. *B25J 9/12* (2013.01); *B25J 17/02* (2013.01)

(58) Field of Classification Search
CPC . B25J 9/12; B25J 17/02; B25J 17/0258; B25J 17/0283
USPC ......................................... 74/490.06; 901/29
See application file for complete search history.

(56) References Cited

U.S. PATENT DOCUMENTS

| | | | | |
|---|---|---|---|---|
| 5,231,889 | A * | 8/1993 | Lee | B25J 17/025 901/29 |
| 8,434,387 | B2 * | 5/2013 | Nakagiri | B25J 17/0258 74/665 R |
| 8,677,854 | B2 * | 3/2014 | Lundberg | B25J 9/06 74/490.03 |
| 9,180,595 | B2 * | 11/2015 | Inada | B25J 19/0029 |

FOREIGN PATENT DOCUMENTS

| | | |
|---|---|---|
| JP | H04-073487 U1 | 6/1992 |
| JP | 2004-174704 A | 6/2004 |
| JP | 2010-094749 A | 4/2010 |
| JP | 2012-056082 A | 3/2012 |
| JP | 5359640 B2 | 12/2013 |

(Continued)

OTHER PUBLICATIONS

International Search Report issued in PCT/JP2019/037654; dated Dec. 10, 2019.

(Continued)

*Primary Examiner* — William C Joyce
(74) *Attorney, Agent, or Firm* — Studebaker & Brackett PC (57) ABSTRACT

A vertical articulated robot includes a first joint axis portion including a first motor configured to rotationally drive a tool flange, and a second joint axis portion including a second motor configured to rotationally drive the first joint axis portion. The first motor includes a portion that overlaps the second motor in a direction orthogonal to both a direction in which a first rotation axis extends and a direction in which a second rotation axis extends.

15 Claims, 9 Drawing Sheets

(56) References Cited

FOREIGN PATENT DOCUMENTS

| JP | 5560260 B2 | 7/2014 |
|---|---|---|
| JP | 2015-171746 A | 10/2015 |
| JP | 2017-226028 A | 12/2017 |

OTHER PUBLICATIONS

Written Opinion issued in PCT/JP2019/037654; dated Dec. 10, 2019.
International Preliminary Report on Patentability issued in PCT/JP2019/037654; dated Oct. 2, 2020.
Written Opinion of the International Preliminary Examing Authority issued in PCT/JP2019/037654; dated May 26, 2020.

* cited by examiner

FIG.1

(FIRST EMBODIMENT)

FIG.2

FIFTH AND SIXTH JOINT AXIS PORTION UNIT

FIG.3

FIFTH AND SIXTH JOINT AXIS PORTIONS

(THIRD MODIFIED EXAMPLE)

FIFTH AND SIXTH JOINT AXIS PORTION UNIT

FIG.9
(SECOND EMBODIMENT)

FIG.10
(SECOND EMBODIMENT)

VERTICAL ARTICULATED ROBOT AND TWO-AXIS ROBOT

CROSS-REFERENCE TO RELATED APPLICATION

This application is a National Stage of International Patent Application No. PCT/JP2019/037654, filed Sep. 25, 2019, the entire content of which is incorporated herein by reference.

TECHNICAL FIELD

The present disclosure relates to a vertical articulated robot and a two-axis robot, and more particularly, it relates to a vertical articulated robot and a two-axis robot each including a motor and a speed reducer.

BACKGROUND ART

Conventionally, a vertical articulated robot including a motor and a speed reducer is known. Such a vertical articulated robot is disclosed in Japanese Patent No. 5560260, for example.

Japanese Patent No. 5560260 discloses a manipulator apparatus that is a 7-axis vertical articulated robot. Each of seven joints of this manipulator apparatus includes a servomotor and a speed reducer directly connected to the servomotor. In Japanese Patent No. 5560260, among the seven joints, the servomotor of a seventh joint at the distal end that drives a seventh arm body to which an end effector (tool) is attached is arranged between the seventh arm body and the servomotor of a sixth joint.

SUMMARY

However, in the manipulator apparatus described in Japanese Patent No. 5560260, the servomotor of the seventh joint at the distal end is arranged between the seventh arm body and the servomotor of the sixth joint, and thus the seventh arm body is far from a rotation axis, which is the output axis of the sixth joint. Therefore, the inertia (moment of inertia) caused by the seventh arm body around the rotation axis of the sixth joint, which is the second axis from the distal end, disadvantageously increases.

Accordingly, the present disclosure provides a vertical articulated robot and a two-axis robot each capable of decreasing the inertia (moment of inertia) around the second rotation axis from the distal end.

A vertical articulated robot according to a first aspect of the present disclosure includes a first joint axis portion including a first motor configured to rotationally drive a tool flange at a distal end to which a tool is attached around a first rotation axis, and a first speed reducer connected to the first motor via a belt mechanism; and a second joint axis portion including a second motor configured to rotationally drive the first joint axis portion around a second rotation axis extending in a direction orthogonal to a direction in which the first rotation axis extends, and a second speed reducer directly connected to the second motor. The first motor includes a portion that overlaps the second motor in a direction orthogonal to both the direction in which the first rotation axis extends and a direction in which the second rotation axis extends in a state in which the first motor is not arranged between the tool flange at the distal end and the second motor.

In the vertical articulated robot according to the first aspect of the present disclosure, as described above, the first motor configured to rotationally drive the tool flange around the first rotation axis includes the portion that overlaps, in the direction orthogonal to both the direction in which the first rotation axis extends and the direction in which the second rotation axis extends, the second motor configured to rotationally drive the first joint axis portion around the second rotation axis extending in the direction orthogonal to the direction in which the first rotation axis extends. Accordingly, unlike a case in which the first motor is arranged at a position overlapping the second motor in the direction in which the first rotation axis extends, the first motor is not arranged between the tool flange at the distal end and the second motor, and thus the tool flange at the distal end can be brought closer to the second rotation axis, which is the output axis of the second joint axis portion, due to the first motor not arranged between the tool flange at the distal end and the second motor. Consequently, it is possible to provide the vertical articulated robot capable of decreasing the inertia (moment of inertia) around the second rotation axis, which is the second axis from the distal end, by the amount by which the tool flange is brought closer to the second rotation axis of the second joint axis portion.

In the aforementioned vertical articulated robot according to the first aspect, the second rotation axis is preferably arranged on the first rotation axis. Accordingly, unlike a case in which the second rotation axis is not arranged on the first rotation axis, the tool flange that rotates around the first rotation axis, and the second rotation axis can be arranged in the same plane, and thus the tool flange can be arranged closer to the second rotation axis of the second joint axis portion. Consequently, the inertia around the second rotation axis can be further decreased.

In the aforementioned vertical articulated robot according to the first aspect, the first motor is preferably a motor without a brake, and the first joint axis portion preferably includes a brake provided so as to face the first motor across the second motor. Accordingly, the brake is provided so as to face the first motor across the second motor such that the brake is also not arranged between the tool flange and the second motor, and thus even when the brake is provided separately from the first motor, the tool flange can be brought closer to the second joint axis portion.

In the aforementioned vertical articulated robot according to the first aspect, the first motor is preferably a motor including a brake, and the first joint axis portion preferably includes no brake other than the brake of the first motor. Accordingly, the brake can be included in the first motor, and thus unlike a case in which the brake is provided outside the first motor, it is not necessary to provide a structure for connecting the first motor to the brake provided outside the first motor. Consequently, the structure of the first joint axis portion can be simplified.

In the aforementioned vertical articulated robot according to the first aspect, the first motor is preferably a motor including a brake, and the first joint axis portion preferably includes a brake provided so as to face the first motor across the second motor. Accordingly, the brake is provided so as to face the first motor across the second motor such that the brake is also not arranged between the tool flange and the second motor, and thus even when the brake is provided separately from the first motor, the tool flange can be brought closer to the second rotation axis of the second joint axis portion.

In the aforementioned vertical articulated robot according to the first aspect, the first motor is preferably a motor without a brake, and the first joint axis portion preferably includes a motor with a brake provided so as to face the first motor across the second motor. Accordingly, the motor with a brake is provided so as to face the first motor across the second motor such that the motor with a brake is also not arranged between the tool flange and the second motor, and thus even when the motor with a brake is provided separately from the first motor, the tool flange can be brought closer to the second rotation axis of the second joint axis portion.

In the aforementioned vertical articulated robot according to the first aspect, the first motor is preferably a motor including a brake, and the first joint axis portion preferably includes a motor with a brake provided so as to face the first motor across the second motor. Accordingly, the motor with a brake is provided so as to face the first motor across the second motor such that the motor with a brake is also not arranged between the tool flange and the second motor, and thus even when the motor with a brake is provided separately from the first motor, the tool flange can be brought closer to the second rotation axis of the second joint axis portion.

A two-axis robot according to a second aspect of the present disclosure includes a first joint axis portion including a first motor configured to rotationally drive a tool flange at a distal end to which a tool is attached around a first rotation axis, and a first speed reducer connected to the first motor via a belt mechanism, and a second joint axis portion including a second motor configured to rotationally drive the first joint axis portion around a second rotation axis extending in a direction orthogonal to a direction in which the first rotation axis extends, and a second speed reducer directly connected to the second motor. The first motor includes a portion that overlaps the second motor in a direction orthogonal to both the direction in which the first rotation axis extends and a direction in which the second rotation axis extends in a state in which the first motor is not arranged between the tool flange at the distal end and the second motor.

In the two-axis robot according to the second aspect of the present disclosure, as described above, the first motor configured to rotationally drive the tool flange around the first rotation axis includes the portion that overlaps, in the direction orthogonal to both the direction in which the first rotation axis extends and the direction in which the second rotation axis extends, the second motor configured to rotationally drive the first joint axis portion around the second rotation axis extending in the direction orthogonal to the direction in which the first rotation axis extends. Accordingly, unlike a case in which the first motor is arranged at a position overlapping the second motor in the direction in which the first rotation axis extends, the first motor is not arranged between the tool flange at the distal end and the second motor, and thus the tool flange at the distal end can be brought closer to the second rotation axis, which is the output axis of the second joint axis portion, due to the first motor not arranged between the tool flange at the distal end and the second motor. Consequently, it is possible to provide the two-axis robot capable of decreasing the inertia (moment of inertia) around the second rotation axis, which is the second axis from the distal end, by the amount by which the tool flange is brought closer to the second rotation axis of the second joint axis portion.

A vertical articulated robot according to a third aspect of the present disclosure includes a first joint axis portion including a first motor configured to rotationally drive a tool flange at a distal end to which a tool is attached around a first rotation axis, and a first speed reducer connected to the first motor via a belt mechanism, and a second joint axis portion including a second motor configured to rotationally drive the first joint axis portion around a second rotation axis extending in a direction orthogonal to a direction in which the first rotation axis extends, and a second speed reducer directly connected to the second motor. The first motor includes a portion that overlaps the second motor as viewed in a direction orthogonal to both the direction in which the first rotation axis extends and a direction in which the second rotation axis extends in a state in which the first motor is not arranged between the tool flange at the distal end and the second motor.

A two-axis robot according to a fourth aspect of the present disclosure includes a first joint axis portion including a first motor configured to rotationally drive a tool flange at a distal end to which a tool is attached around a first rotation axis, and a first speed reducer connected to the first motor via a belt mechanism, and a second joint axis portion including a second motor configured to rotationally drive the first joint axis portion around a second rotation axis extending in a direction orthogonal to a direction in which the first rotation axis extends, and a second speed reducer directly connected to the second motor. The first motor includes a portion that overlaps the second motor as viewed in a direction orthogonal to both the direction in which the first rotation axis extends and a direction in which the second rotation axis extends in a state in which the first motor is not arranged between the tool flange at the distal end and the second motor.

According to the present disclosure, as described above, it is possible to provide the vertical articulated robot and the two-axis robot each capable of decreasing the inertia (moment of inertia) around the second rotation axis from the distal end.

BRIEF DESCRIPTION OF THE DRAWINGS

A perspective view showing the overall configuration of a vertical articulated robot according to a first embodiment.

DETAILED DESCRIPTION

Embodiments embodying the present disclosure are hereinafter described on the basis of the drawings.

First Embodiment

Configuration of Vertical Articulated Robot

The configuration of a vertical articulated robot 100 according to a first embodiment of the present disclosure is now described with reference to FIGS. 1 to 4.

Figure 1:
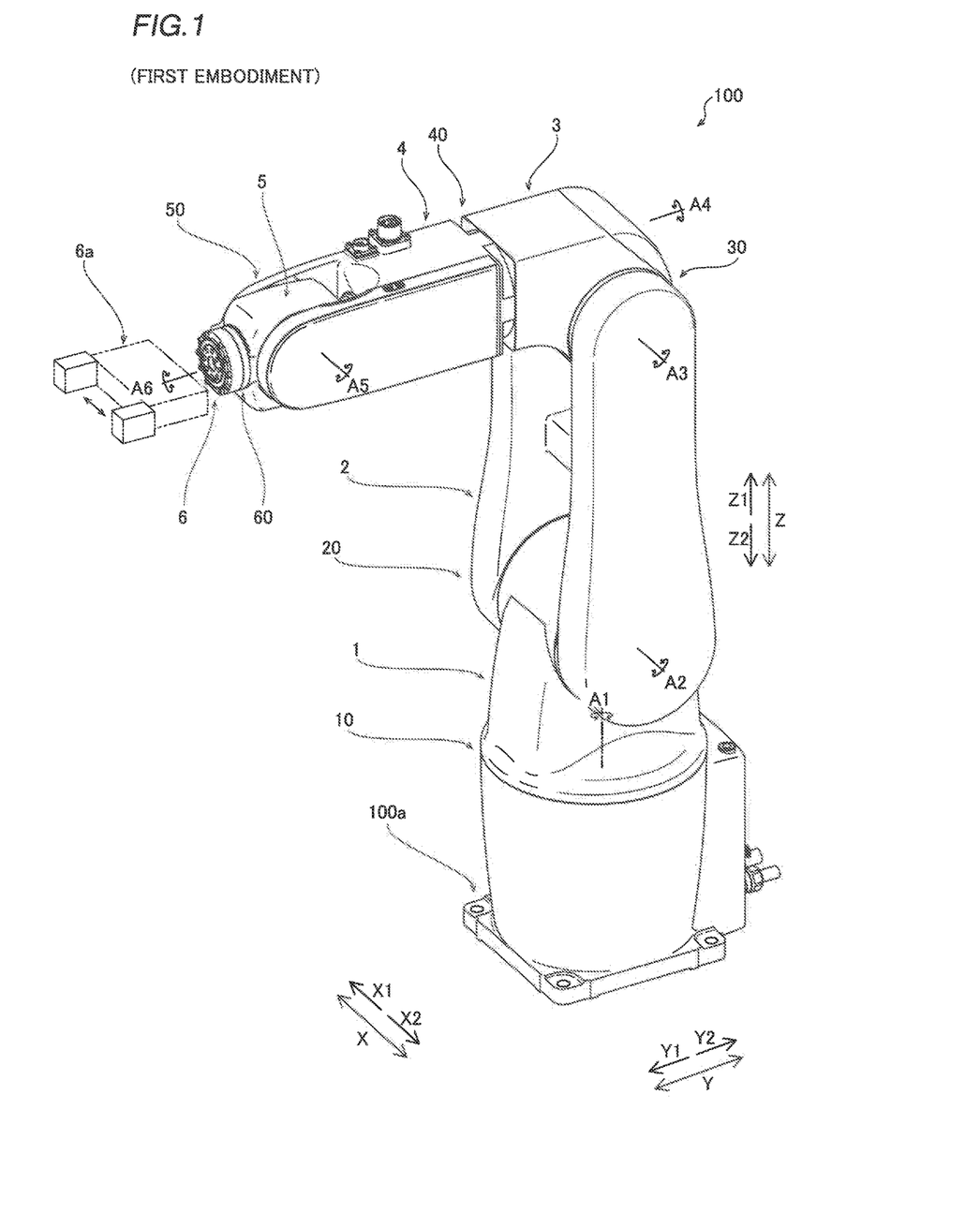

As shown in FIG. 1, the vertical articulated robot 100 is a 6-axis robot having six degrees of freedom. The vertical articulated robot 100 is installed on an installation surface such as a floor via a base 100a.

The vertical articulated robot 100 includes a plurality of (six) arms 1 to 6 and a plurality of (six) joint axis portions 10 to 60 to rotationally drive the plurality of arms 1 to 6. The plurality of arms 1 to 6 include a first arm 1, a second arm 2, a third arm 3, a fourth arm 4, a fifth arm 5, and a sixth arm 6. The plurality of joint axis portions 10 to 60 include a first joint axis portion 10, a second joint axis portion 20, a third joint axis portion 30, a fourth joint axis portion 40, a fifth joint axis portion 50, and a sixth joint axis portion 60. The fifth joint axis portion 50 and the sixth joint axis portion 60 are examples of a "second joint axis portion" and a "first joint axis portion" in the claims, respectively.

The first joint axis portion 10 rotationally drives the first arm 1 around a rotation axis A1 extending along a vertical direction (Z direction). The first arm 1 connects the first joint axis portion 10 to the second joint axis portion 20. The second joint axis portion 20 rotationally drives the second arm 2 around a rotation axis A2 extending along a width direction (X direction, horizontal direction) orthogonal to a direction in which the second arm 2 extends. The second arm 2 connects the second joint axis portion 20 to the third joint axis portion 30. The third joint axis portion 30 rotationally drives the third arm 3 around a rotation axis A3 extending along the width direction (X direction, horizontal direction) orthogonal to a direction in which the third arm 3 extends. The third arm 3 connects the third joint axis portion 30 to the fourth joint axis portion 40.

The fourth joint axis portion 40 rotationally drives the fourth arm 4 around a rotation axis A4 extending along a direction (Y direction) in which the fourth arm 4 extends. The fourth arm 4 connects the fourth joint axis portion 40 to the fifth joint axis portion 50. The fifth joint axis portion 50 rotationally drives the fifth arm 5 around a rotation axis A5 extending along the horizontal direction (X direction). The fifth arm 5 connects the fifth joint axis portion 50 to the sixth joint axis portion 60. The sixth joint axis portion 60 rotationally drives the sixth arm 6 around a rotation axis A6 extending along a direction (Y direction) orthogonal to the rotation axis A5. The sixth arm 6 is a tool flange, and a tool 6a (end effector) is attached to the sixth arm 6. The fifth joint axis portion 50, the fifth arm 5, the sixth joint axis portion 60, and the sixth arm 6 correspond to a wrist structure. The rotation axes A5 and A6 are examples of a "second rotation axis" and a "first rotation axis" in the claims, respectively.

Configurations of Fifth and Sixth Joint Axis Portions

Figure 2:
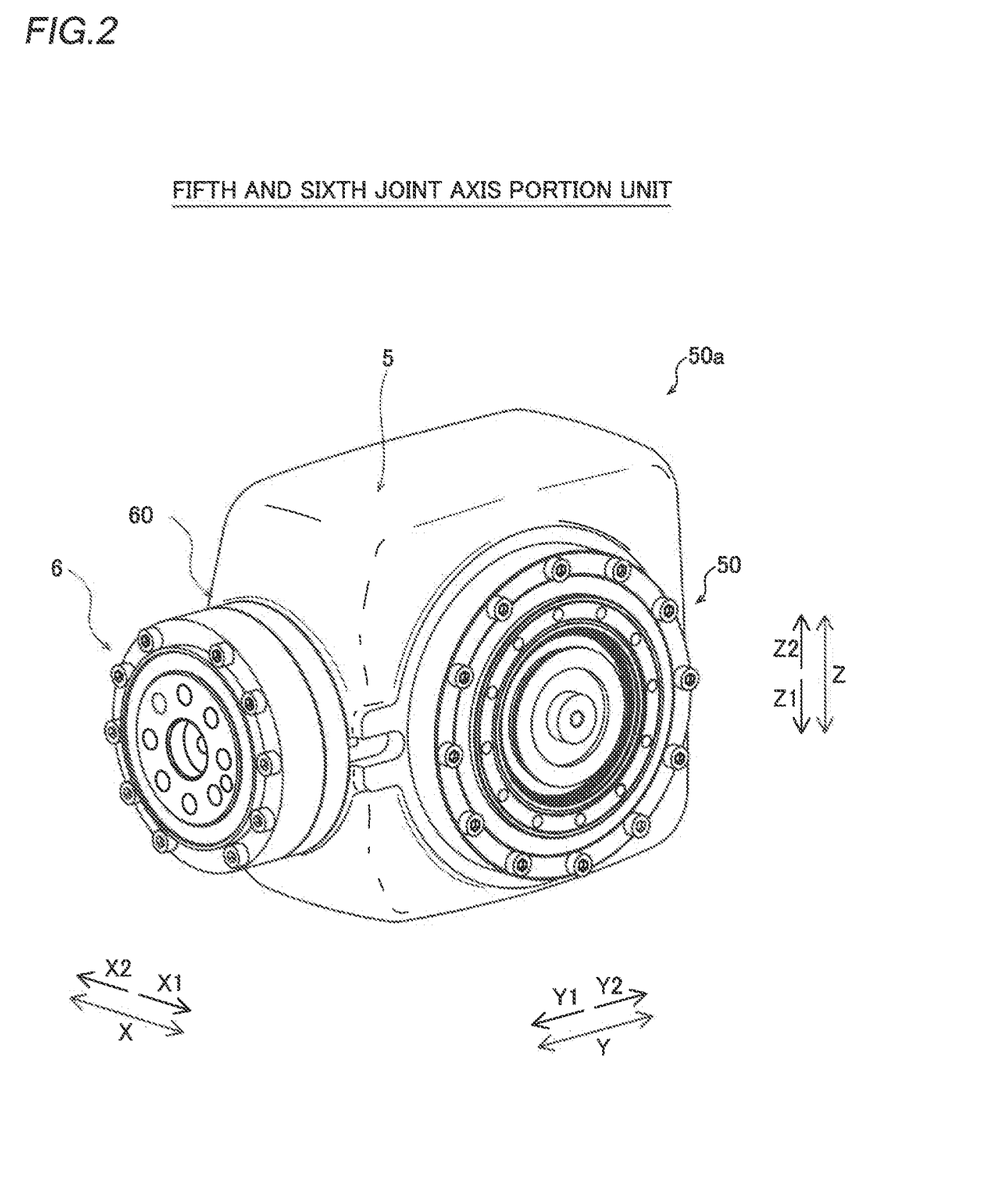
FIG. 2 is a perspective view showing a fifth and sixth joint axis portion unit of the vertical articulated robot according to the first embodiment.
Figure 3:
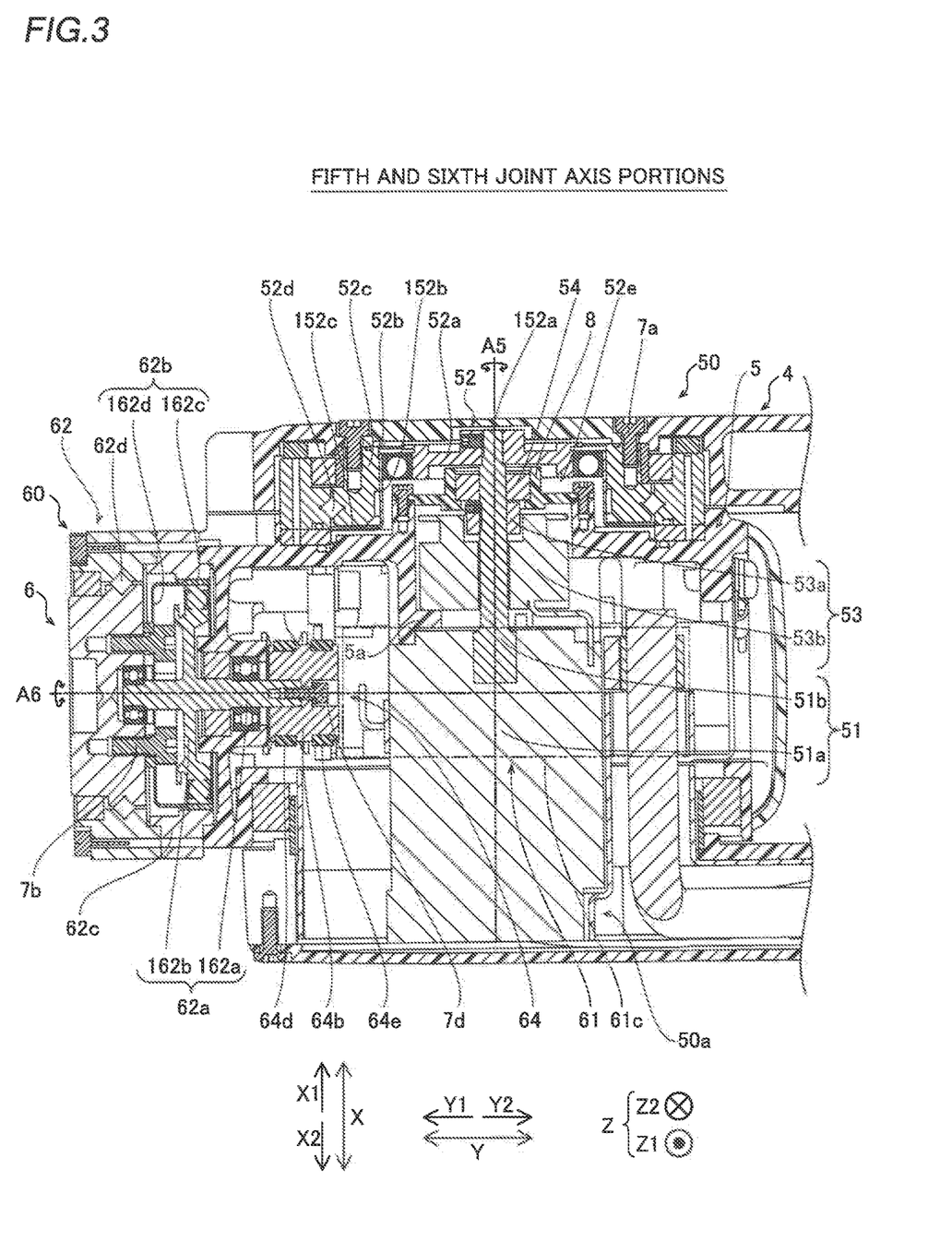
FIG. 3 is a sectional view showing fifth and sixth joint axis portions of the vertical articulated robot according to the first embodiment.
Figure 4:
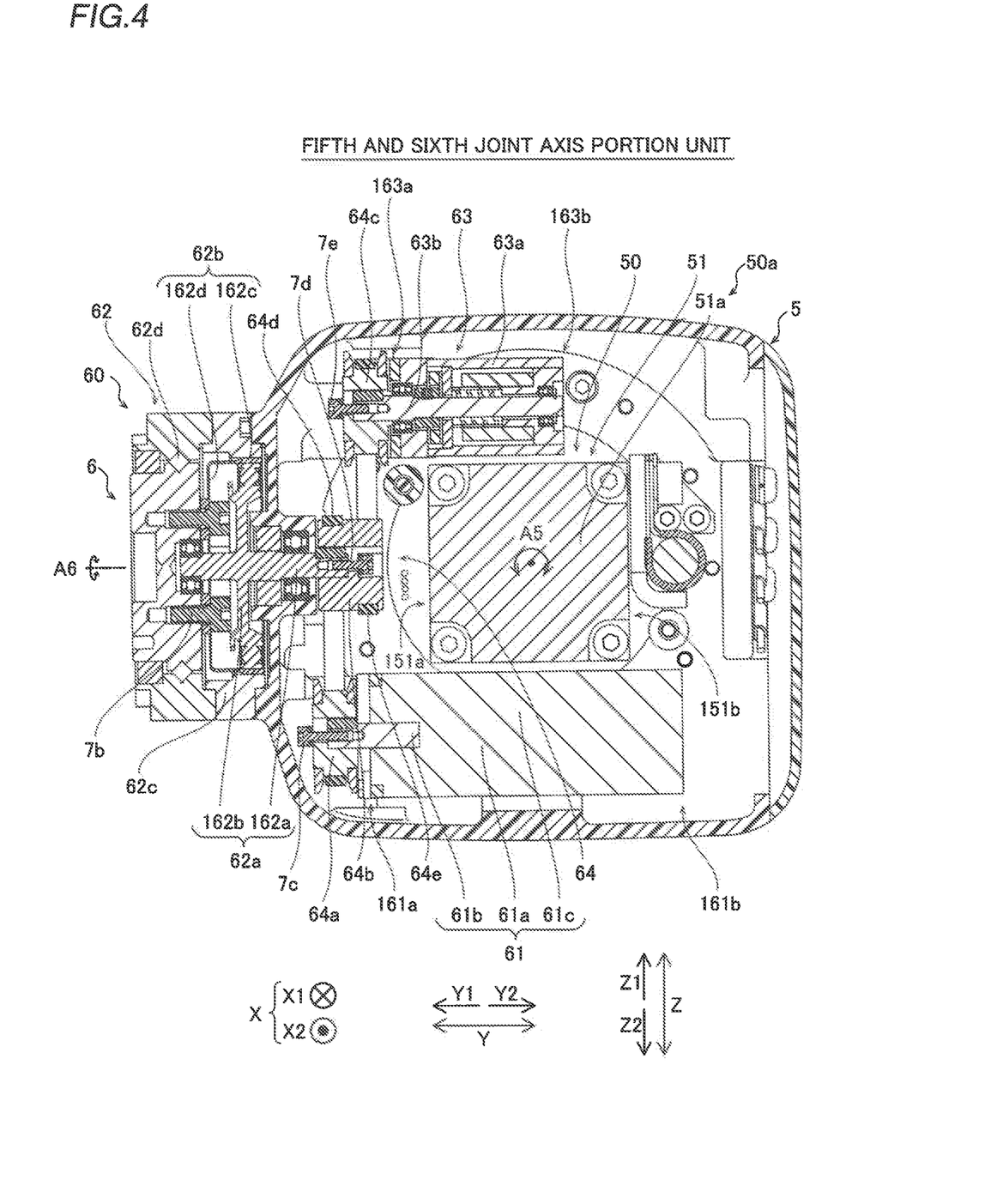
FIG. 4 is a sectional view showing the fifth and sixth joint axis portion unit of the vertical articulated robot according to the first embodiment.

As shown in FIGS. 2 to 4, the fifth joint axis portion 50 and the sixth joint axis portion 60 corresponding to the wrist structure include form a fifth and sixth joint axis portion unit 50a integrally including the fifth joint axis portion 50, the sixth joint axis portion 60, the fifth arm 5, and the sixth arm 6. The fifth and sixth joint axis portion unit 50a are attachable and attachable while integrally including the fifth joint axis portion 50, the sixth joint axis portion 60, the fifth arm 5, and the sixth arm 6. Thus, the fifth joint axis portion 50, the sixth joint axis portion 60, the fifth arm 5, and the sixth arm 6 can be integrally handled, and thus the fifth joint axis portion 50, the sixth joint axis portion 60, the fifth arm 5, and the sixth arm 6 can be easily assembled and replaced.

The fifth joint axis portion 50 includes a motor 51, a speed reducer 52, a brake 53, and an oil seal 54. The motor 51 and the speed reducer 52 are examples of a "second motor" and a "second speed reducer" in the claims, respectively.

The motor 51 rotationally drives the sixth joint axis portion 60 around the rotation axis A5 extending in a direction (X direction) orthogonal to a direction in which the rotation axis A6 extends by rotationally driving the fifth arm 5. The motor 51 is attached to the fifth arm 5 by a fixing tool such as a screw (not shown). The motor 51 includes a housing 51a and a motor shaft 51b. The housing 51a houses a stator, a rotor, etc. On the other hand, the housing 51a does not house a brake and an oil seal. That is, the motor 51 is a motor without a brake and an oil seal, which does not include the brake and the oil seal in the housing 51a. Therefore, the housing 51a of the motor 51 has a smaller length in an axial direction (X direction) than a housing of a motor with a brake and an oil seal, which includes the brake and the oil seal in the housing. The motor shaft 51b is an output shaft of the motor 51, and extends along a direction (X direction) in which the rotation axis A5 extends. The motor shaft 51b is directly connected to the speed reducer 52.

The speed reducer 52 is arranged coaxially with the motor 51 and is directly connected to the motor shaft 51b of the motor 51. The speed reducer 52 is a wave gear speed reducer including a wave generator 52a, a flexspline 52b, and a circular spline 52c. The wave generator 52a is an input of the speed reducer 52, and the motor shaft 51b is inserted into a through-hole 152a for connection such that the wave generator 52a is connected to the motor shaft 51b. The flexspline 52b is an output of the speed reducer 52 and is connected to the fifth arm 5. The circular spline 52c is a fixed portion of the speed reducer 52 and is attached to the flexspline 52b. Furthermore, the speed reducer 52 includes a bearing 52d. The bearing 52d rotatably holds the flexspline 52b. The bearing 52d is a cross-roller bearing.

The wave generator 52a has an elliptical disk shape including the through-hole 152a for inserting the motor shaft 51b at the center of rotation. The wave generator 52a is attached to the flexspline 52b by being press-fitted into a cylindrical portion 152b of the flexspline 52b described below. The flexspline 52b includes the cylindrical portion 152b and a flange 152c. The cylindrical portion 152b has a hollow shape and extends along the direction (X direction) in which the rotation axis A5 extends. The cylindrical portion 152b includes external teeth that mesh with internal teeth of the circular spline 52c. The flange 152c has an annular shape and extends outward (to a side away from the center of rotation) from an end of the cylindrical portion 152b on the motor 51 side (X2 direction side). The circular spline 52c has an annular shape and includes the internal teeth that mesh with the external teeth of the flexspline 52b.

The flexspline 52b, which is the output of the speed reducer 52, is attached to the fifth arm 5 by a fixing tool such as a screw (not shown) at the flange 152c. Furthermore, the circular spline 52c, which is the fixed portion of the speed reducer 52, is attached to the fourth arm 4 by a fixing tool 7a such as a screw.

The brake 53 holds the motor 51. The brake 53 is a non-excitation actuated electromagnetic brake that holds the motor 51 when it is not energized and releases the holding of the motor 51 when it is energized. A brake hub 53a of the brake 53 is attached to a central portion of the motor shaft 51b by a set screw. A main body 53b of the brake 53 is attached to a brake holder 5a of the fifth arm 5 by a fixing tool such as a screw (not shown). The oil seal 54 seals the grease of the speed reducer 52. The oil seal 54 is mounted on the motor shaft 51b. The oil seal 54 is held by an oil seal holder 8 provided separately from the fourth arm 4 and the fifth arm 5.

The brake 53 and the oil seal 54 are provided outside the housing 51a of the motor 51, separately from the motor 51. The brake 53 and the oil seal 54 are arranged between the housing 51a of the motor 51 and the wave generator 52a of the speed reducer 52 in the direction (X direction) in which the rotation axis A5 extends. The brake 53 and the oil seal 54 are arranged in this order from the motor 51 side (X2 direction side) toward the speed reducer 52 side (X1 direction side).

The sixth joint axis portion 60 includes a motor 61 (see FIG. 4), a speed reducer 62, a brake 63 (see FIG. 4), and a belt mechanism 64. The motor 61 and the speed reducer 62 are examples of a "first motor" and a "first speed reducer" in the claims, respectively.

The motor 61 rotationally drives the sixth arm 6, which is a tool flange, around the rotation axis A6. The motor 61 is attached to the fifth arm 5 by a fixing tool such as a screw (not shown). The motor 61 includes a housing 61a and a motor shaft 61b. The housing 61a houses a stator, a rotor, etc. On the other hand, the housing 61a does not house a brake. That is, the motor 61 is a motor without a brake, which does not include the brake in the housing 61a (no brake is provided). Therefore, the housing 61a of the motor 61 has a smaller length in the axial direction (Y direction) than a housing of a motor with a brake (a motor including a brake), which includes the brake in the housing. The motor shaft 61b is an output shaft of the motor 61, and extends along the direction (Y direction) in which the rotation axis A6 extends. The motor shaft 61b is connected to the speed reducer 62 via the belt mechanism 64.

In the first embodiment, the motor 61 includes a portion 61c that overlaps the motor 51 in the direction (Z direction) orthogonal to both the direction (Y direction) in which the rotation axis A6 extends and the direction (X direction) in which the rotation axis A5 extends. The portion 61c is a portion including a portion of the housing 61a. The portion 61c is arranged at a position overlapping the motor 51 in the direction (Z direction) orthogonal to both the direction (Y direction) in which the rotation axis A6 extends and the direction (X direction) in which the rotation axis A5 extends. Specifically, the motor 61 is arranged such that the portion 61c including a portion of the housing 61a faces the housing 51a of the motor 51 in the Z direction. A first end 161a of the housing 61a of the motor 61 on the Y1 direction side is arranged on the Y1 direction side relative to a first end 151a of the housing 51a of the motor 51 on the Y1 direction side. Furthermore, a second end 161b of the housing 61a of the motor 61 on the Y2 direction side is arranged on the Y2 direction side relative to a second end 151b of the housing 51a of the motor 51 on the Y2 direction side. That is, the housing 61a of the motor 61 is arranged so as to face the housing 51a in the Z direction from the first end 151a to the second end 151b of the housing 51a of the motor 51. Furthermore, the motor 61 is arranged close to the motor 51 in the Z direction.

In the first embodiment, the rotation axis A5 is arranged on the rotation axis A6. In other words, the rotation axis A6 is arranged on the rotation axis A5. The rotation axis A6 and the rotation axis A5 are arranged in the same plane (in an X-Y plane). That is, the output axis of the sixth joint axis portion 60 and the output axis of the fifth joint axis portion 50 are arranged in the same plane. Therefore, the sixth arm 6, which is a tool flange, the speed reducer 62 of the sixth joint axis portion 60, and the motor 51 and the speed reducer 52 of the fifth joint axis portion 50 are arranged at the same height in the direction (Z direction) orthogonal to both the direction (Y direction) in which the rotation axis A6 extends and the direction (X direction) in which the rotation axis A5 extends. Furthermore, the sixth arm 6, which is a tool flange, the speed reducer 62 of the sixth joint axis portion 60, and the motor 51 of the fifth joint axis portion 50 are arranged at positions overlapping each other in the direction in which the rotation axis A6 extends.

The speed reducer 62 is arranged such that the axis thereof does not overlap the axis of the motor 61 and is connected to the motor shaft 61b of the motor 61 via the belt mechanism 64. The speed reducer 62 is a wave gear speed reducer including a wave generator 62a, a flexspline 62b, and a circular spline 62c. The wave generator 62a is an input of the speed reducer 62, and an input shaft 162a is connected to a pulley 64b of the belt mechanism 64 described below such that the wave generator 62a is connected to the motor shaft 61b via the belt mechanism 64. The flexspline 62b is an output of the speed reducer 62 and is connected to the sixth arm 6. The circular spline 62c is a fixed portion of the speed reducer 62 and is attached to the flexspline 62b. The speed reducer 62 includes a bearing 62d. The bearing 62d rotatably holds the flexspline 62b. The bearing 62d is a cross-roller bearing.

The wave generator 62a includes the input shaft 162a and a disk 162b. The disk 162b is press-fitted into a cylindrical portion 162c of the flexspline 62b described below such that the wave generator 62a is attached to the flexspline 62b. The flexspline 62b has a cup shape and includes the cylindrical portion 162c that is a side of the cup and a bottom 162d of the cup. The cylindrical portion 162c has a hollow shape and extends along the direction (Y direction) in which the rotation axis A6 extends. The cylindrical portion 162c includes external teeth that mesh with internal teeth of the circular spline 62c. The bottom 162d extends inward (to a side closer to the center of rotation) from an end of the cylindrical portion 162c on a side (Y1 direction side) opposite to the motor 61 side. The circular spline 62c has an annular shape and includes the internal teeth that mesh with the external teeth of the flexspline 62b.

The flexspline 62b, which is the output of the speed reducer 62, is attached to the sixth arm 6 by a fixing tool 7b such as a screw at the bottom 162d. Furthermore, the circular spline 62c, which is the fixed portion of the speed reducer 62, is attached to the fifth arm 5 by a fixing tool such as a screw (not shown).

The brake 63 holds the motor 61. The brake 63 is a non-excitation actuated electromagnetic brake that holds the motor 61 when it is not energized and releases the holding of the motor 61 when it is energized. The brake 63 is provided outside the housing 61a of the motor 61, separately from the motor 61.

In the first embodiment, the brake 63 is arranged so as to face the motor 61 across the motor 51 in the direction (Z direction) orthogonal to both the direction (Y direction) in which the rotation axis A6 extends and the direction (X direction) in which the rotation axis A5 extends. Therefore, the brake 63 is arranged at a position overlapping the motor 51 in the direction orthogonal to both the direction in which the rotation axis A6 extends and the direction in which the rotation axis A5 extends. A first end 163a of a housing 63a of the brake 63 on the Y1 direction side is arranged on the Y1 direction side relative to the first end 151a of the housing 51a of the motor 51 on the Y1 direction side. Furthermore, a second end 163b of the housing 63a of the brake 63 on the Y2 direction side is arranged on the Y1 direction side relative to the second end 151b of the housing 51a of the motor 51 on the Y2 direction side. That is, the housing 63a of the brake 63 is arranged so as to face the housing 51a in the Z direction from the first end 151a of the housing 51a of the motor 51 to a position on the Y1 direction side relative to the second end 151b. Furthermore, the brake 63 is arranged close to the motor 51 in the Z direction.

The brake 63 and the motor 61 are arranged so as to face each other across a plane (in the X-Y plane) including the rotation axis A6 and the rotation axis A5. That is, the brake 63 and the motor 61 are arranged on a first side and a second side with respect to the plane including the rotation axis A6 and the rotation axis A5, respectively. The brake 63 and the motor 61 are arranged in the same plane orthogonal to the rotation axis A5.

The belt mechanism 64 transmits the driving force of the motor 61 to the speed reducer 62. The belt mechanism 64 transmits the braking force (holding force) of the brake 63 to the motor 61. The belt mechanism 64 includes a plurality of (three) pulleys 64a to 64c and a plurality of (two) belts 64d and 64e. The pulley 64a is attached to the motor shaft 61b by a fixing tool 7c such as a screw. The pulley 64b is attached to the input shaft 162a of the wave generator 62a by a fixing tool 7d such as a screw. The pulley 64c is attached to an input shaft 63b of the brake 63 by a fixing tool 7e such as a screw. The belt 64d is mounted between the pulley 64a and the pulley 64b. The belt 64e is mounted between the pulley 64b and the pulley 64c. At least a portion (the pulley 64b, the belt 64d, the belt 64e, etc.) of the belt mechanism 64 is arranged between the speed reducer 62 and the motor 51. The size of the belt mechanism 64 in the Y direction is smaller than the size of the motor 61 in the Y direction.

The fifth and sixth joint axis portion unit 50a integrally includes the motor 51, the speed reducer 52, the brake 53 and the oil seal 54 of the fifth joint axis portion 50, the motor 61, the speed reducer 62, the brake 63, and the belt mechanism 64 of the sixth joint axis portion 60, the oil seal holder 8, the fifth arm 5, and the sixth arm 6. Furthermore, the fifth and sixth joint axis portion unit 50a is attachable and detachable while integrally including the motor 51, the speed reducer 52, the brake 53, and the oil seal 54 of the fifth joint axis portion 50, the motor 61, the speed reducer 62, the brake 63, and the belt mechanism 64 of the sixth joint axis portion 60, the oil seal holder 8, the fifth arm 5, and the sixth arm 6.

Advantageous Effects of First Embodiment

According to the first embodiment, the following advantageous effects are achieved.

According to the first embodiment, as described above, the motor 61 configured to rotationally drive the sixth arm 6 around the rotation axis A6 is arranged at the position overlapping, in the direction orthogonal to both the direction in which the rotation axis A6 extends and the direction in which the rotation axis A5 extends, the motor 51 configured to rotationally drive the sixth joint axis portion 60 around the rotation axis A5 extending in the direction orthogonal to the direction in which the rotation axis A6 extends. Accordingly, unlike a case in which the motor 61 is arranged at a position overlapping the motor 51 in the direction in which the rotation axis A6 extends, the motor 61 is not arranged between the sixth arm 6 at the distal end, which is a tool flange, and the motor 51, and thus the sixth arm 6 at the distal end, which is a tool flange, can be brought closer to the rotation axis A5, which is the output axis of the fifth joint axis portion 50, due to the motor 61 not arranged between the sixth arm 6 at the distal end, which is a tool flange, and the motor 51. Consequently, the inertia (moment of inertia) around the rotation axis A5, which is the second axis from the distal end, can be decreased by the amount by which the sixth arm 6, which is a tool flange, is brought closer to the rotation axis A5 of the fifth joint axis portion 50.

As described above, the sixth joint axis portion 60 includes the motor 61 and the speed reducer 62 connected to the motor 61 via the belt mechanism 64. Accordingly, the sixth joint axis portion 60 can have a structure in which the motor 61 and the speed reducer 62 are connected to each other via the belt mechanism 64, and thus as compared with a case in which the motor 61 and the speed reducer 62 are directly connected to each other without the belt mechanism 64, the degree of freedom in arranging the motor 61 can be improved. Consequently, the motor 61 can be easily arranged at the position overlapping the motor 51 in the direction orthogonal to both the direction in which the rotation axis A6 extends and the direction in which the rotation axis A5 extends.

As described above, the fifth joint axis portion 50 includes the motor 51 and the speed reducer 52 directly connected to the motor 51. Accordingly, the fifth joint axis portion 50, which has a larger load because the fifth joint axis portion 50 is farther from a working point by the tool 6a as compared with the sixth joint axis portion 60, can have a structure in which the motor 51 and the speed reducer 52 are directly connected to each other without the belt mechanism. Consequently, unlike a case in which the motor 51 and the speed reducer 52 are connected to each other via the belt mechanism, it is possible to effectively prevent a decrease in the positioning accuracy due to stretching of the belt.

According to the first embodiment, as described above, the rotation axis A5 is arranged on the rotation axis A6. Accordingly, unlike a case in which the rotation axis A5 is not arranged on the rotation axis A6, the sixth arm 6, which is a tool flange that rotates around the rotation axis A6, and the rotation axis A5 can be arranged in the same plane, and thus the sixth arm 6, which is a tool flange, can be arranged closer to the rotation axis A5 of the fifth joint axis portion 50. Consequently, the inertia around the rotation axis A5 can be further decreased.

According to the first embodiment, as described above, the motor 61 is a motor without a brake. Furthermore, the sixth joint axis portion 60 includes the brake 63 provided so as to face the motor 61 across the motor 51. Accordingly, the motor 61 can be downsized as compared with a case in which the motor 61 is a motor with a brake (a motor including a brake). Furthermore, the brake 63 is provided so as to face the motor 61 across the motor 51 such that the brake 63 is also not arranged between the sixth arm 6, which is a tool flange, and the motor 51, and thus even when the brake 63 is provided separately from the motor 61, the sixth arm 6, which is a tool flange, can be brought closer to the fifth joint axis portion 50.

First Modified Example of First Embodiment

A first modified example of the first embodiment is now described with reference to FIG. 5. In the first modified example of the first embodiment, an example in which a motor 261, which is a motor with a brake, is provided in a sixth joint axis portion 260 is described unlike the first embodiment in which the motor 61, which is a motor without a brake, and the brake 63 are provided in the sixth joint axis portion 60. In the figures, the same or similar configurations as those of the first embodiment are denoted by the same reference numerals, and description thereof is omitted. The sixth joint axis portion 260 is an example of a "first joint axis portion" in the claims. The motor 261 is an example of a "first motor" in the claims.

Configuration of Sixth Joint Axis Portion

Figure 5:
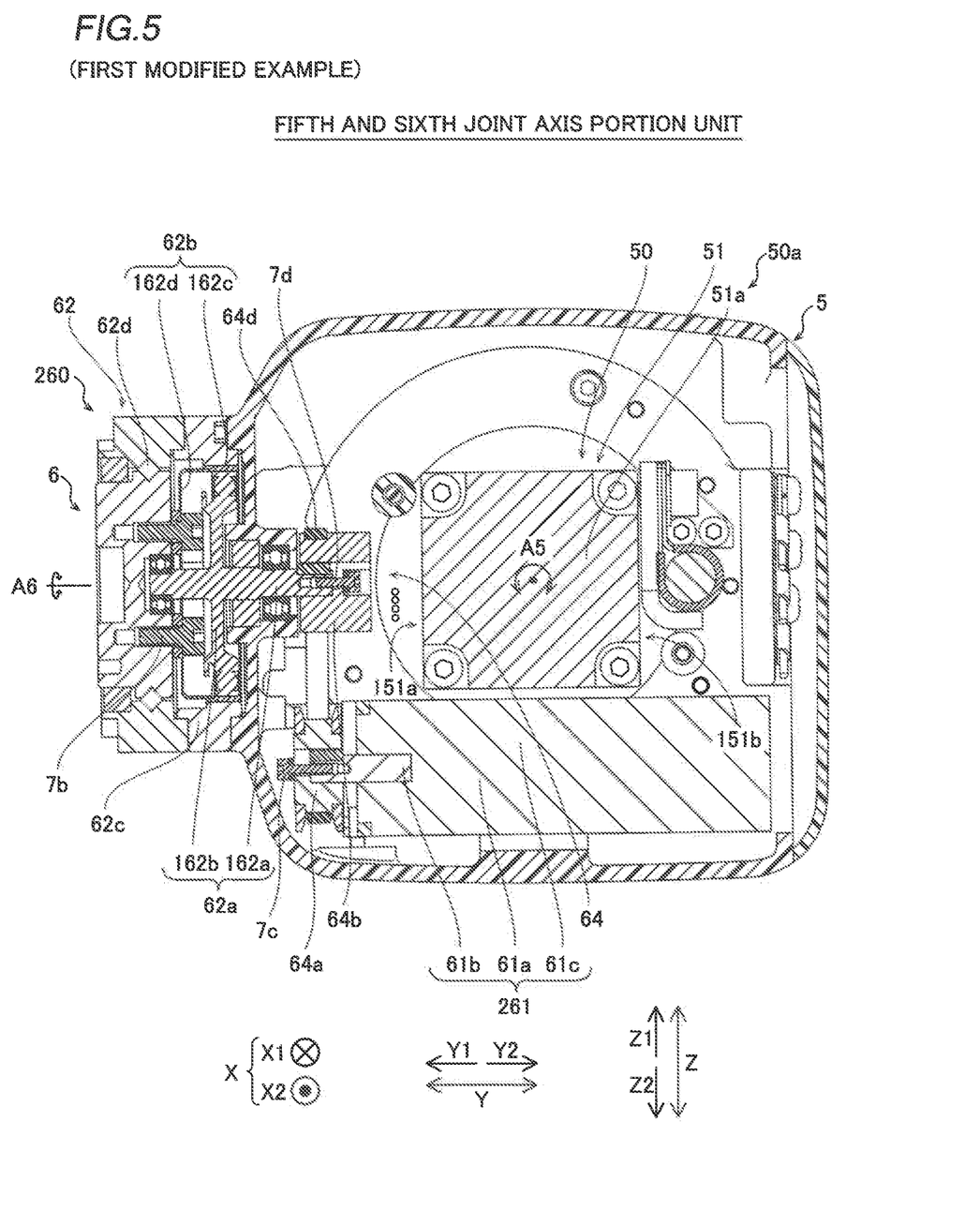
FIG. 5 is a sectional view showing a fifth and sixth joint axis portion unit of a vertical articulated robot according to a first modified example of the first embodiment.

As shown in FIG. 5, the sixth joint axis portion 260 according to the first modified example of the first embodiment of the present disclosure includes the motor 261, which is a motor with a brake (a motor including a brake) including the brake in a housing 61a. On the other hand, the sixth joint axis portion 260 does not include a brake other than the brake of the motor 261. That is, the sixth joint axis portion 260 does not include the brake 63 according to the first embodiment. Furthermore, the sixth joint axis portion 260 does not include the pulley 64c and the belt 64e, which are the configurations for the brake 63 of the belt mechanism 64 according to the first embodiment.

The remaining configurations of the first modified example of the first embodiment are similar to those of the first embodiment.

Advantageous Effects of First Modified Example

According to the first modified example, as described above, the motor 261 is a motor including a brake. Furthermore, the sixth joint axis portion 260 does not include a brake other than the brake of the motor 261. Accordingly, the brake can be included in the motor 261, and thus unlike a case in which the brake is provided outside the motor 261, it is not necessary to provide a structure for connecting the motor 261 to the brake provided outside the motor 261. Consequently, the structure of the sixth joint axis portion 260 can be simplified. Furthermore, in the first modified example of the first embodiment, the brake 63, the pulley 64c, and the belt 64e according to the first embodiment are not provided, and thus the belt mechanism 64 can be downsized. Consequently, the belt mechanism 64 is downsized, and thus a sixth arm 6, which is a tool flange, can be brought closer to a rotation axis A5 of a fifth joint axis portion 50.

The remaining advantageous effects of the first modified example of the first embodiment are similar to those of the first embodiment.

Second Modified Example of First Embodiment

A second modified example of the first embodiment is now described with reference to FIG. 6. In the second modified example of the first embodiment, an example in which a motor 261, which is a motor with a brake, and a brake 63 are provided in a sixth joint axis portion 360 is described unlike the first embodiment in which the motor 61, which is a motor without a brake, and the brake 63 are provided in the sixth joint axis portion 60. In the figures, the same or similar configurations as those of the first embodiment are denoted by the same reference numerals, and description thereof is omitted. The sixth joint axis portion 360 is an example of a "first joint axis portion" in the claims.

Configuration of Sixth Joint Axis Portion

Figure 6:
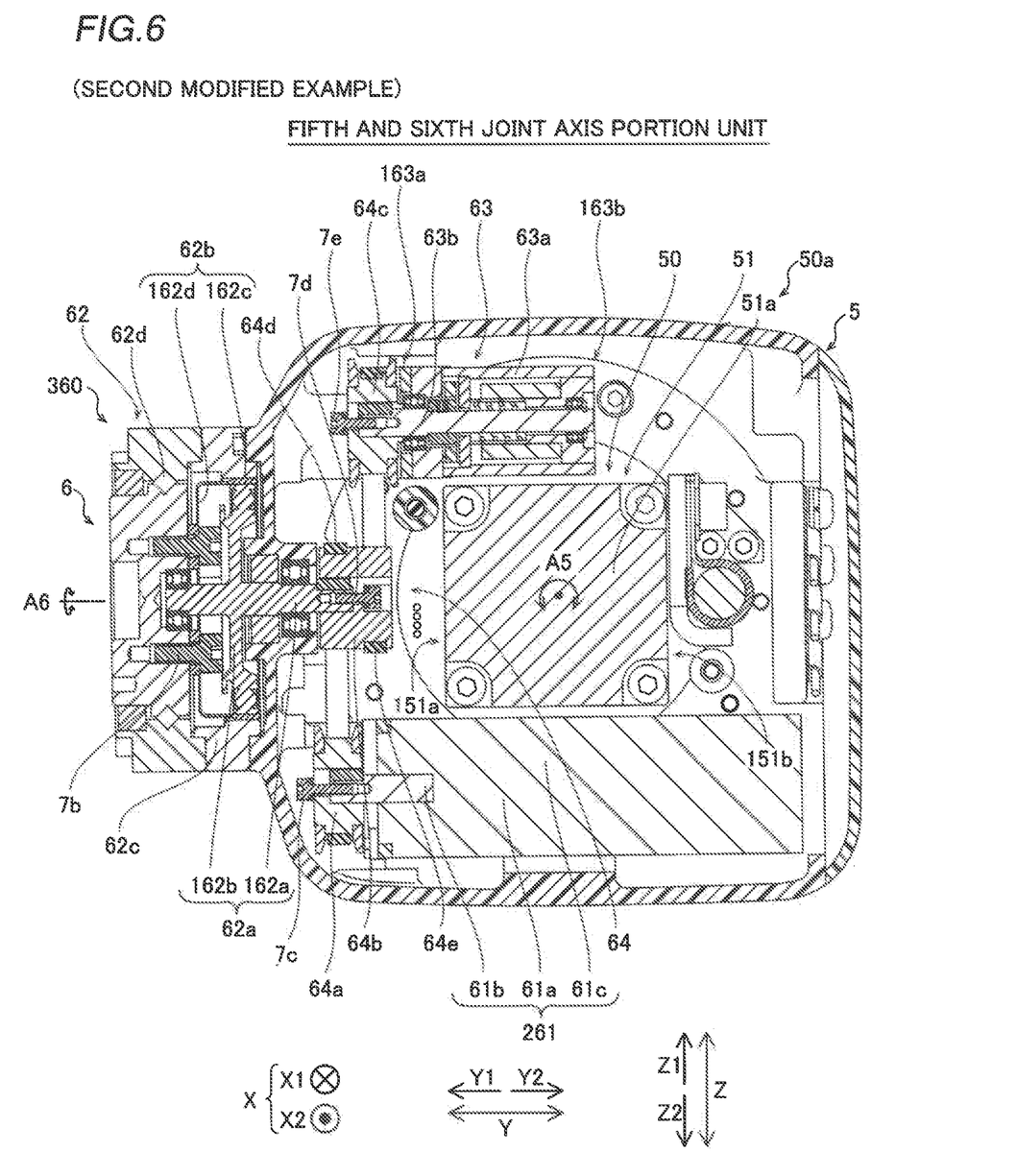
FIG. 6 is a sectional view showing a fifth and sixth joint axis portion unit of a vertical articulated robot according to a second modified example of the first embodiment.

As shown in FIG. 6, the sixth joint axis portion 360 according to the second modified example of the first embodiment of the present disclosure includes the motor 261, which is a motor with a brake according to the first modified example of the first embodiment, and the brake 63 according to the first embodiment. Similarly to the first embodiment, the brake 63 is provided so as to face the motor 261 across the motor 51. Although detailed description is omitted, the positional relationship between the motor 261, the brake 63, and a motor 51 is the same or similar as the positional relationship between the motor 61, the brake 63, and the motor 51 according to the first embodiment.

The remaining configurations of the second modified example of the first embodiment are similar to those of the first embodiment.

Advantageous Effects of Second Modified Example

According to the second modified example, as described above, the motor 261 is a motor including a brake. The sixth joint axis portion 360 includes the brake 63 provided so as to face the motor 261 across the motor 51. Accordingly, the motor 261, which is a motor with a brake, and the brake 63, which is different from the motor 261, can be used for holding, and thus the holding force of the sixth joint axis portion 360 can be increased. Furthermore, the brake 63 is provided so as to face the motor 261 across the motor 51 such that the brake 63 is also not arranged between a sixth arm 6, which is a tool flange, and the motor 51, and thus even when the brake 63 is provided separately from the motor 261, the sixth arm 6, which is a tool flange, can be brought closer to a rotation axis A5 of a fifth joint axis portion 50.

The remaining advantageous effects of the second modified example of the first embodiment are similar to those of the first embodiment.

Third Modified Example of First Embodiment

A third modified example of the first embodiment is now described with reference to FIG. 7. In the third modified example of the first embodiment, an example in which a motor 61, which is a motor without a brake, and a motor 465 with a brake are provided in a sixth joint axis portion 460 is described unlike the first embodiment in which the motor 61, which is a motor without a brake, and the brake 63 are provided in the sixth joint axis portion 60. In the figures, the same or similar configurations as those of the first embodiment are denoted by the same reference numerals, and description thereof is omitted. The sixth joint axis portion 460 is an example of a "first joint axis portion" in the claims.

Configuration of Sixth Joint Axis Portion

Figure 7:
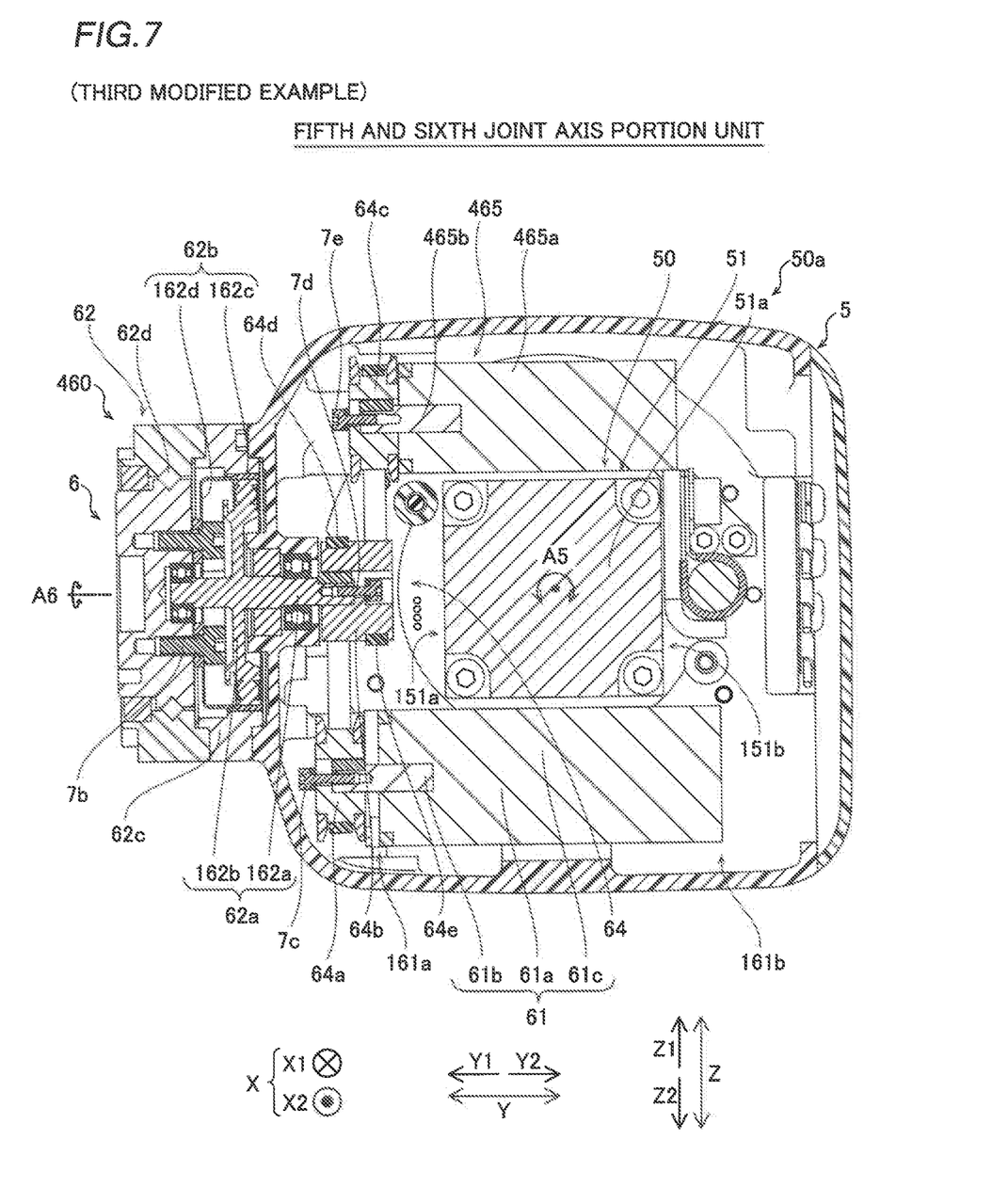
FIG. 7 is a sectional view showing a fifth and sixth joint axis portion unit of a vertical articulated robot according to a third modified example of the first embodiment.

As shown in FIG. 7, the sixth joint axis portion 460 according to the third modified example of the first embodiment of the present disclosure includes the motor 61 according to the first embodiment and the motor 465 with a brake.

The motor 465 with a brake rotationally drives a sixth arm 6, which is a tool flange, around a rotation axis A6 together with the motor 61. The motor 465 with a brake rotationally drives the arm 6 in synchronization with the motor 61. The motor 465 with a brake includes a housing 465a and a motor shaft 465b. The housing 465a houses a stator, a rotor, a brake, etc. That is, the motor 465 with a brake is a motor (a motor including a brake), which includes the brake in the housing 465a. The motor shaft 465b is an output shaft of the motor 465, and extends along a direction (Y direction) in which the rotation axis A6 extends. The motor shaft 465b is connected to a speed reducer 62 via a belt mechanism 64, similarly to the brake 63 according to the first embodiment.

The motor 465 with a brake is provided so as to face the motor 61 across a motor 51. Although detailed description is omitted, the positional relationship between the motor 61, the motor 465 with a brake, and the motor 51 is the same or similar as the positional relationship between the motor 61, the brake 63, and the motor 51 according to the first embodiment.

The remaining configurations of the third modified example of the first embodiment are similar to those of the first embodiment.

Advantageous Effects of Third Modified Example

According to the third modified example, as described above, the motor 61 is a motor without a brake. Furthermore, the sixth joint axis portion 460 includes the motor 465 with a brake provided so as to face the motor 61 across the motor 51. Accordingly, the motor 61 can be downsized as compared with a case in which the motor 61 is a motor with a brake. Furthermore, the motor 61 and the motor 465 with a brake, which is different from the motor 61, can rotationally drive the sixth arm 6, which is a tool flange, and thus the driving force of the sixth joint axis portion 460 can be increased. Alternatively, the driving force of the motor 61 can be borne by the motor 465 with a brake, which is different from the motor 61, and thus the motor 61 can be downsized by the amount of driving force borne by the motor 465 with a brake. Furthermore, the motor 465 with a brake is provided so as to face the motor 61 across the motor 51 such that the motor 465 with a brake is also not arranged between the sixth arm 6, which is a tool flange, and the motor 51, and thus even when the motor 465 with a brake is provided separately from the motor 61, the sixth arm 6, which is a tool flange, can be brought closer to a rotation axis A5 of a fifth joint axis portion 50.

The remaining advantageous effects of the third modified example of the first embodiment are similar to those of the first embodiment.

Fourth Modified Example of First Embodiment

A fourth modified example of the first embodiment is now described with reference to FIG. 8. In the fourth modified example of the first embodiment, an example in which a motor 261, which is a motor with a brake, and a motor 465 with a brake are provided in a sixth joint axis portion 560 is described unlike the first embodiment in which the motor 61, which is a motor without a brake, and the brake 63 are provided in the sixth joint axis portion 60. In the figures, the same or similar configurations as those of the first embodiment are denoted by the same reference numerals, and description thereof is omitted. The sixth joint axis portion 560 is an example of a "first joint axis portion" in the claims.

Configuration of Sixth Joint Axis Portion

Figure 8:
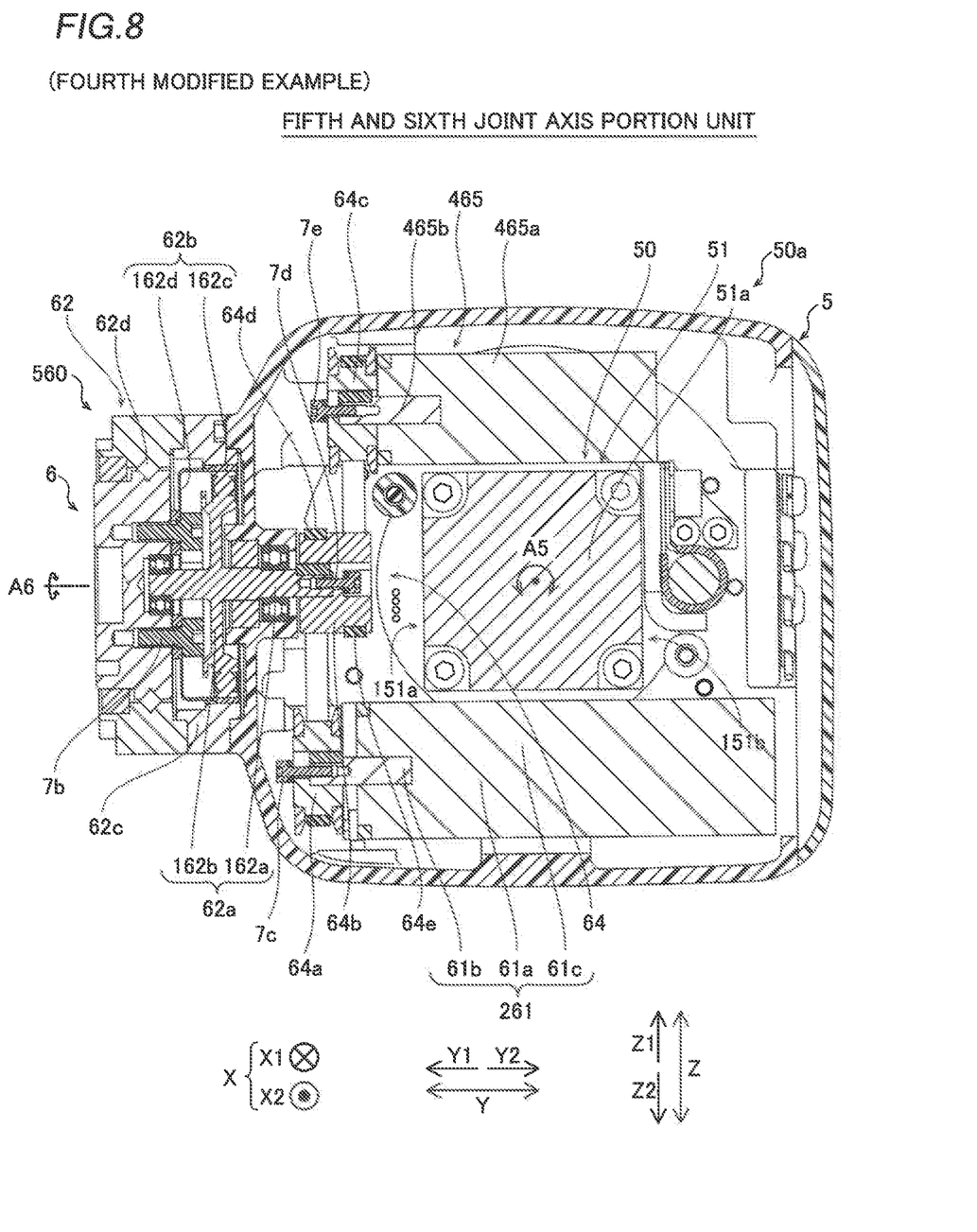
FIG. 8 is a sectional view showing a fifth and sixth joint axis portion unit of a vertical articulated robot according to a fourth modified example of the first embodiment.

As shown in FIG. 8, the sixth joint axis portion 560 according to the fourth modified example of the first embodiment of the present disclosure includes the motor 261 according to the first modified example of the first embodiment and the motor 465 with a brake according to the third modified example of the first embodiment. The motor 465 with a brake is provided so as to face the motor 261 across the motor 51. Although detailed description is omitted, the positional relationship between the motor 261, the motor 465 with a brake, and a motor 51 is the same or similar as the positional relationship between the motor 61, the brake 63, and the motor 51 according to the first embodiment.

The remaining configurations of the fourth modified example of the first embodiment are similar to those of the first embodiment.

Advantageous Effects of Fourth Modified Example

According to the fourth modified example, as described above, the motor 261 is a motor including a brake. Furthermore, the sixth joint axis portion 560 includes the motor 465 with a brake provided so as to face the motor 261 across the motor 51. Accordingly, the motor 261, which is a motor with a brake, and the motor 465 with a brake, which is different from the motor 261, can be used for holding, and thus the holding force of the sixth joint axis portion 560 can be increased. Furthermore, a sixth arm 6, which is a tool flange, can be rotationally driven by the motor 261 and the motor 465 with a brake, which is different from the motor 261, and thus the driving force of the sixth joint axis portion 560 can be increased. Alternatively, the driving force of the motor 261 can be borne by the motor 465 with a brake, which is different from the motor 261, and thus the motor 261 can be downsized by the amount of driving force borne by the motor 465 with a brake. Furthermore, the motor 465 with a brake is provided so as to face the motor 261 across the motor 51 such that the motor 465 with a brake is also not arranged between the sixth arm 6, which is a tool flange, and the motor 51, and thus even when the motor 465 with a brake is provided separately from the motor 261, the sixth arm 6, which is a tool flange, can be brought closer to a rotation axis A5 of a fifth joint axis portion 50.

The remaining advantageous effects of the fourth modified example of the first embodiment are similar to those of the first embodiment.

Second Embodiment

A second embodiment is now described with reference to FIGS. 9 and 10. In this second embodiment, an example of a two-axis robot is described unlike the first embodiment in which an example of the vertical articulated robot is described.

Configuration of Two-Axis Robot

Figure 9:
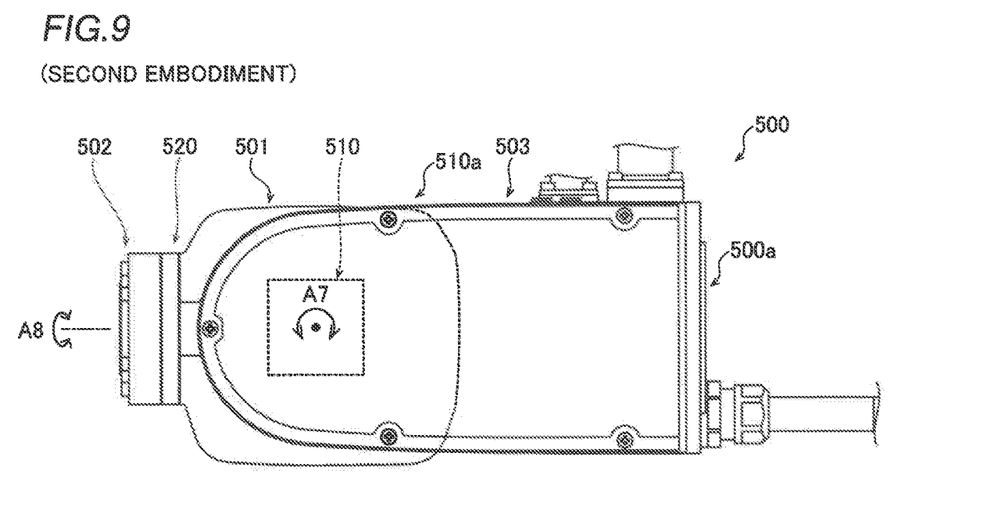
FIG. 9 is a plan view showing the overall configuration of a two-axis robot according to a second embodiment.

As shown in FIG. 9, a two-axis robot 500 according to the second embodiment is a robot having two degrees of freedom. The two-axis robot 500 is attached to an attachment target such as a horizontal articulated robot 600 (see FIG. 10) via a mount 500a.

The two-axis robot 500 includes two arms 501 and 502 and two joint axis portions 510 and 520 that rotationally drive the two arms 501 and 502. The joint axis portion 510 rotationally drives the arm 501 around a rotation axis A7. The arm 501 connects the joint axis portion 510 to the joint axis portion 520. The joint axis portion 520 rotationally drives the arm 502 around a rotation axis A8 extending along a direction orthogonal to the rotation axis A7. The arm 502 is a tool flange, and a tool (end effector) is attached to the arm 502. The joint axis portions 510 and 520 are examples of a "second joint axis portion" and a "first joint axis portion" in the claims, respectively. The rotation axes A7 and A8 are examples of a "second rotation axis" and a "first rotation axis" in the claims, respectively.

Although detailed description is omitted, the joint axis portion 510 and the joint axis portion 520 form a joint axis portion unit 510a integrally including the joint axis portion 510, the joint axis portion 520, the arm 501, and the arm 502. Although detailed description is omitted, the joint axis portion unit 510a has the same or similar configuration as the fifth and sixth joint axis portion unit 50a according to the first embodiment. That is, the joint axis portion unit 510a has the structure shown in FIGS. 2 to 4. The joint axis portion unit 510a may have the structure shown in the first to fourth modified examples of the first embodiment. In the two-axis robot 500, the joint axis portion unit 510a is supported by a support 503 including the mount 500a at its end.

Figure 10:
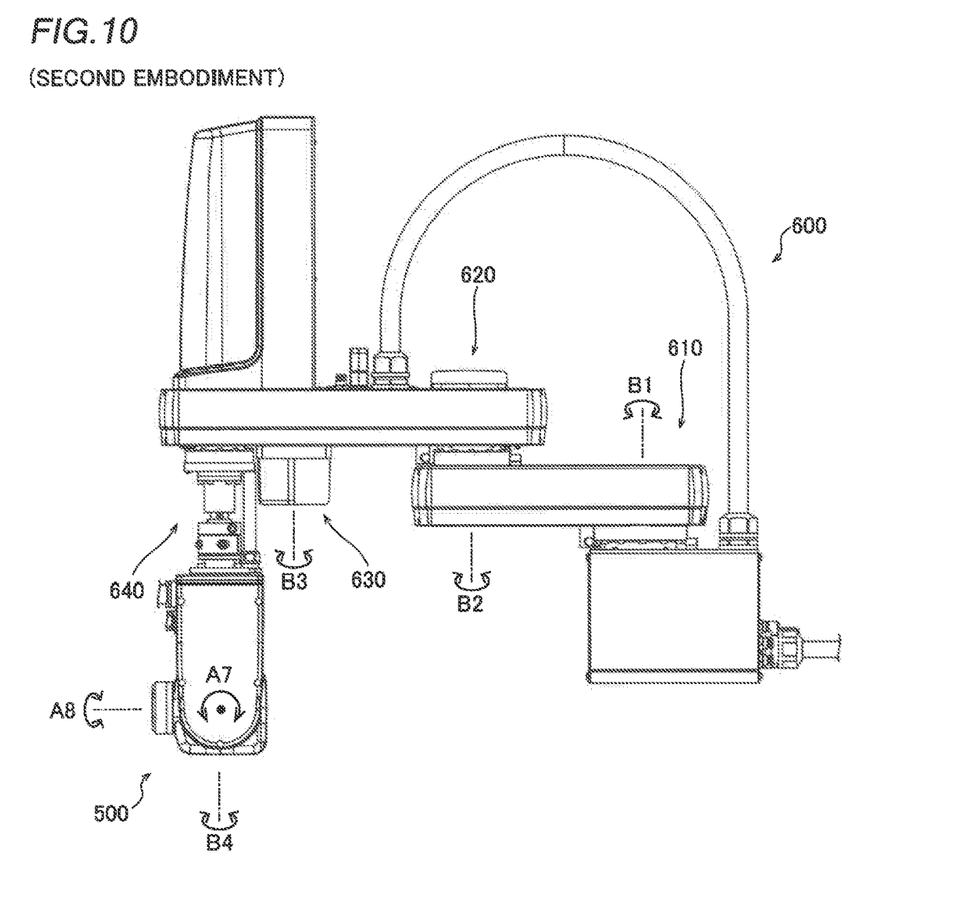
FIG. 10 is a diagram showing a two-axis robot according to the second embodiment attached to a horizontal articulated robot.

As shown in FIG. 10, the two-axis robot 500 can be used by being attached to the horizontal articulated robot 600. The horizontal articulated robot 600 is a four-axis robot having four degrees of freedom. The horizontal articulated robot 600 includes a plurality of (three) joint axis portions 610, 620, and 640, and a vertical axis portion 630. The joint axis portions 610, 620, and 640 are rotationally driven around rotation axes B1, B2, and B4 extending along a vertical direction, respectively. Furthermore, the vertical axis portion 630 is rotationally driven around a rotation axis B3 extending along the vertical direction to drive the joint axis portion 640 in the vertical direction. The two-axis robot 500 is connected to the joint axis portion 640 of the horizontal articulated robot 600. In this case, the two-axis robot 500 functions as a fifth joint axis portion and a sixth joint axis portion of the horizontal articulated robot 600.

The remaining configurations of the second embodiment are similar to those of the first embodiment.

Advantageous Effects of Second Embodiment

According to the second embodiment, the following advantageous effects are achieved.

According to the second embodiment, as described above, the joint axis portion unit 510a is configured similarly to the fifth and sixth joint axis portion unit 50a according to the first embodiment. Accordingly, similarly to the first embodiment, the inertia (moment of inertia) around the rotation axis A7, which is the second axis from the distal end, can be decreased.

The remaining advantageous effects of the second embodiment are similar to those of the first embodiment.

Modified Examples

The embodiments disclosed this time must be considered as illustrative in all points and not restrictive. The scope of the present disclosure is not shown by the above description of the embodiments but by the scope of claims for patent, and all modifications (modified examples) within the meaning and scope equivalent to the scope of claims for patent are further included.

For example, while the example in which the vertical articulated robot is a six-axis robot having six degrees of freedom has been shown in the aforementioned first embodiment, the present disclosure is not restricted to this. In the present disclosure, the vertical articulated robot may be a robot having five or less degrees of freedom, or a robot having seven or more degrees of freedom.

While the example in which the rotation axis A5 (second rotation axis) is arranged on the rotation axis A6 (first rotation axis) has been shown in the aforementioned first embodiment, the present disclosure is not restricted to this. In the present disclosure, the second rotation axis may not be arranged on the first rotation axis. That is, the first rotation axis and the second rotation axis may not be arranged in the same plane.

While the example in which the fifth and sixth joint axis portion unit integrally including the fifth joint axis portion (the second joint axis portion according to the present disclosure) and the sixth joint axis portion (the first joint axis portion according to the present disclosure) is formed has been shown in the aforementioned first embodiment, the present disclosure is not restricted to this. In the present disclosure, the unit integrally including the first joint axis portion and the second joint axis portion may not be formed.

While the example in which the speed reducer is a wave gear speed reducer has been shown in each of the aforementioned first and second embodiments, the present disclosure is not restricted to this. In the present disclosure, the speed reducer may be a speed reducer other than the wave gear speed reducer.

What is claimed is:

1. A vertical articulated robot comprising:
   a first joint axis portion including a first motor configured to rotationally drive a tool flange at a distal end to which a tool is attached around a first rotation axis and having an output shaft extending in a direction along the first rotation axis, and a first speed reducer connected to the first motor via a belt mechanism; and
   a second joint axis portion including a second motor configured to rotationally drive the first joint axis portion around a second rotation axis extending in a direction orthogonal to a direction in which the first rotation axis extends, and a second speed reducer directly connected to the second motor; wherein
   the first motor includes a portion that overlaps the second motor in a direction orthogonal to both the direction in which the first rotation axis extends and a direction in which the second rotation axis extends in a state in which the first motor is not arranged between the tool flange at the distal end and the second motor.

2. The vertical articulated robot according to claim 1, wherein the second rotation axis is arranged on the first rotation axis.

3. The vertical articulated robot according to claim 2, wherein
   the first motor is a motor without a brake; and
   the first joint axis portion includes a brake configured to face the first motor across the second motor.

4. The vertical articulated robot according to claim 2, wherein
   the first motor is a motor including a brake; and
   the first joint axis portion includes no brake other than the brake of the first motor.

5. The vertical articulated robot according to claim 2, wherein
   the first motor is a motor including a brake; and
   the first joint axis portion includes a brake configured to face the first motor across the second motor.

6. The vertical articulated robot according to claim 2, wherein
   the first motor is a motor without a brake; and
   the first joint axis portion includes a motor with a brake configured to face the first motor across the second motor.

7. The vertical articulated robot according to claim 2, wherein
   the first motor is a motor including a brake; and
   the first joint axis portion includes a motor with a brake configured to face the first motor across the second motor.

8. The vertical articulated robot according to claim 1, wherein
the first motor is a motor without a brake; and
the first joint axis portion includes a brake configured to face the first motor across the second motor.

9. The vertical articulated robot according to claim 1, wherein
the first motor is a motor including a brake; and
the first joint axis portion includes no brake other than the brake of the first motor.

10. The vertical articulated robot according to claim 1, wherein
the first motor is a motor including a brake; and
the first joint axis portion includes a brake configured to face the first motor across the second motor.

11. The vertical articulated robot according to claim 1, wherein
the first motor is a motor without a brake; and
the first joint axis portion includes a motor with a brake configured to face the first motor across the second motor.

12. The vertical articulated robot according to claim 1, wherein
the first motor is a motor including a brake; and
the first joint axis portion includes a motor with a brake configured to face the first motor across the second motor.

13. A two-axis robot comprising:
a first joint axis portion including a first motor configured to rotationally drive a tool flange at a distal end to which a tool is attached around a first rotation axis and having an output shaft extending in a direction along the first rotation axis, and a first speed reducer connected to the first motor via a belt mechanism; and
a second joint axis portion including a second motor configured to rotationally drive the first joint axis portion around a second rotation axis extending in a direction orthogonal to a direction in which the first rotation axis extends, and a second speed reducer directly connected to the second motor; wherein
the first motor includes a portion that overlaps the second motor in a direction orthogonal to both the direction in which the first rotation axis extends and a direction in which the second rotation axis extends in a state in which the first motor is not arranged between the tool flange at the distal end and the second motor.

14. A vertical articulated robot comprising:
a first joint axis portion including a first motor configured to rotationally drive a tool flange at a distal end to which a tool is attached around a first rotation axis and having an output shaft extending in a direction along the first rotation axis, and a first speed reducer connected to the first motor via a belt mechanism; and
a second joint axis portion including a second motor configured to rotationally drive the first joint axis portion around a second rotation axis extending in a direction orthogonal to a direction in which the first rotation axis extends, and a second speed reducer directly connected to the second motor; wherein
the first motor includes a portion that overlaps the second motor as viewed in a direction orthogonal to both the direction in which the first rotation axis extends and a direction in which the second rotation axis extends in a state in which the first motor is not arranged between the tool flange at the distal end and the second motor.

15. A two-axis robot comprising:
a first joint axis portion including a first motor configured to rotationally drive a tool flange at a distal end to which a tool is attached around a first rotation axis and having an output shaft extending in a direction along the first rotation axis, and a first speed reducer connected to the first motor via a belt mechanism; and
a second joint axis portion including a second motor configured to rotationally drive the first joint axis portion around a second rotation axis extending in a direction orthogonal to a direction in which the first rotation axis extends, and a second speed reducer directly connected to the second motor; wherein
the first motor includes a portion that overlaps the second motor as viewed in a direction orthogonal to both the direction in which the first rotation axis extends and a direction in which the second rotation axis extends in a state in which the first motor is not arranged between the tool flange at the distal end and the second motor.

* * * * *